Patented June 30, 1936

2,046,090

UNITED STATES PATENT OFFICE 2,046,090

METHOD OF HALOGENATING COMPOUNDS AND PRODUCT RESULTING THEREFROM

Cortes F. Reed, Anoka, Minn., assignor of one-half to Charles L. Horn, Minneapolis, Minn.

No Drawing. Application December 29, 1933, Serial No. 704,591

27 Claims. (Cl. 260—99.10)

This invention relates to a novel and improved method of halogenating cyclic or acyclic compounds and to a new product resulting from such method of halogenation.

The primary object of the present invention is to provide a novel and improved method of halogenating compounds either of the aliphatic or aromatic series which shall permit halogenation to any desired degree, that is, any desired number of hydrogen atoms may be replaced by a similar number of halogen atoms up to a number not greater than the number of carbon atoms in the compound.

Another object is to provide a novel and improved method which shall permit the substitution of one halogen atom for one hydrogen atom only, on the same carbon atom of the compound. In other words, while several or all of the carbon atoms of the compound may have a hydrogen atom replaced with a halogen atom, my method prevents two or more halogen atoms from uniting with the same carbon atom in the compound.

Another object is to provide a method of halogenating compounds of the aforesaid character wherein a hydrogen atom is first replaced by a new group of elements and then such group is replaced by a halogen atom, such successive replacement, however, being carried out as one operation.

A further object is to provide a new product consisting of a compound of the open or closed chain series, wherein some of the hydrogen atoms have been replaced by halogen atoms and at least one of the hydrogen atoms has been replaced by the aforementioned new group of elements to provide a new product which may be easily hydrolized or saponified or capable of readily reacting with other chemical compounds.

A still further object is to provide a novel and improved method of halogenating compounds of this general character which shall be inexpensive to carry out, easy to control, and wherein the tendency of the compound being halogenated to polymerize may be easily avoided.

The foregoing and other objects and advantages will become more apparent as the description proceeds, and will be pointed out in the appended claims.

In carrying out my invention, the compound to be halogenated, if a gas or liquid, needs no further preparation other than the application of heat to start the reaction when necessary, or the use of a diluent, or chilling when the reaction at the start is too fast. In the case of solids, these may be liquefied either by heat, if possible, without disturbing their chemical structure, or by the use of a solvent, or both.

I have discovered that when compounds of either the aliphatic or aromatic series are treated with a mixture of sulphur dioxide and one of the halogens in the gaseous form, as for example chlorine, these two gases appear to react with each other to form what might be termed hypochlor sulphurous chloride and having a structural formula of:

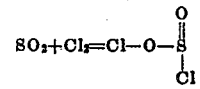

When these two gases are bubbled through one of the aforementioned compounds, as for example, one having a structural formula of

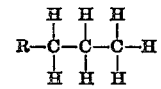

where R is any radicle, the aforementioned hypochlor sulphurous chloride appear to first react with one of the hydrogen atoms to effect the substitution of a hypochlor sulphurous chloride group and split off hydrochloric acid as indicated by the following equation:

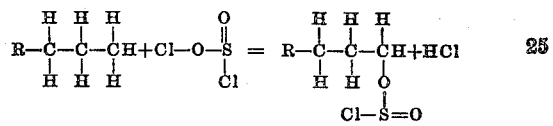

Continued bubbling of these two gases through the compound appears to remove this hypochlor sulphurous chloride group and effect a substitution of a chlorine atom therefor, meanwhile the hypochlor sulphurous chloride reacts with a hydrogen atom of another carbon group as indicated by the following equation:

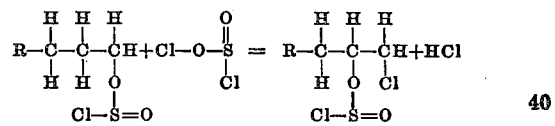

During the above reaction, the sulphur dioxide compound appears to act more or less as a protecting agent and prevent dichlor substitutions on the same carbon atom. Thus as long as the reaction is continued, a hydrogen atom on each carbon atom is replaced with an atom of chlorine until eventually all of the available hydrogen atoms are replaced by chlorine atoms, and the result is a direct chlor substitution product.

I find it highly desirable, however, to stop the reaction before the last hypochlor sulphurous chloride group is replaced by an atom of chlorine as the completely chlorinated compound does not hydrolize or saponify as readily, if at all, as when the aforementioned hypochlor sulphurous chloride group is present in the halogenated compound.

The hypochlor sulphurous chloride group is very unstable at best, and is formed only in the absence of water. This group is very easily hydrolized or saponified and when formed on compounds of the shorter chain hydrocarbons, it decomposes immediately upon the addition of water with considerable violence and generation of heat. On the longer chain hydrocarbons, there is a lessening of action as the number of carbon atoms increase. Thus, for example, hydrocarbons containing as many as 24 carbon atoms, react very slowly in boiling water but readily with a weak alkaline solution. During the stage of hydrolysis, a true sulphite group is formed rendering the hydrocarbon partially, if not wholly, soluble, a condition extremely favorable for the removal of the substituted chlorine atoms and replacing it or them with a hydroxyl group or groups.

When the chlorine and sulphite radicle or group has been replaced with hydroxyl groups, the hydrocarbon becomes water soluble, the degree of solubility depending upon the ratio of the size of the molecule and the number of hydroxyl groups which the molecule contains.

During the halogenation of the compound with sulphur dioxide, I find that it is important to control the temperature of the reaction so that polymerization of the compound does not occur. This is particularly true with compounds of the aliphatic series, and as a specific example, the chlorination of paraffin will be used.

Paraffin was heated to 90°–95° C. to liquefy the same and chlorine and sulphur dioxide gases were bubbled through the liquid. After a gain in weight of 20–25%, the temperature was reduced to between 40° and 50° C. for the remaining chlorination. By controlling the temperature of the reaction, polymerization of the paraffin was avoided. Experiments have shown that if the temperature is not controlled, the chlorination of the paraffin is accompanied by rise in temperature, due to the exothermic reaction, which causes the product to assume a dark color indicating polymerization, and the resulting product, although a chlorinated paraffin, is not the same product from the standpoint of chemical structure, as the product produced by temperature control.

The chlorinated paraffin produced by temperature control is a moderately viscous oil, light yellow in color, and liquid, at room temperature. This product from all indications, where $C_{24}$ and $H_{50}$ is representative of paraffin wax, appears to have a general structural formula of

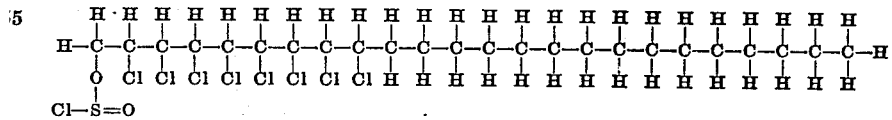

The number of chlorine substitutions is of course dependent upon the length of time the paraffin is chlorinated and it will be understood that in the above example, the number of substitutions is purely illustrative and that more or less substitutions could be made varying from one to the complete substitution product.

I prefer, however, to stop chlorination short of complete substitution, so that the hypochlor sulphurous chloride group will be present, as I find that with this group present, the chlorinated paraffin is readily hydrolized or saponified. As pointed out above, the presence of this group on the shorter chain hydrocarbons, causes the chlorinated product to decompose immediately upon the addition of water, while on the longer chain hydrocarbons, there is a lessening of action as the number of carbon atoms increase. With hydrocarbons containing as many as 24 carbon atoms, the reactive tendency has slowed down until the chlorinated product is only slowly hydrolized in boiling water, but readily hydrolized with a weak alkaline solution.

When chlorinated paraffin has been hydrolized, that is, the hypochlor sulphurous chloride radicle and chlorine has been replaced by hydroxyl groups, the hydrocarbon becomes water soluble, and becomes a polyhydric alcohol.

This is also true of any of the aliphatic compounds which have been chlorinated by my improved method and these alcohols readily form esters with both the mineral and organic acids. These polyhydric alcohols are soluble in water, ether, alcohol, acids, benzene, carbon tetrachloride, carbon bisulphide, petroleum products and various fats and oils. Due to their wide range of solubility, they are very useful in forming emulsions of normally incompatible substances, for example, paraffin, asphalt, gasoline, or any of the petroleum hydrocarbons and water, any of the vegetable oils or glycerides and water, or water, or ether, carbon tetrachloride, carbon bisulphite, etc. and water. For the above reason also they are very useful as detergents, and possessing great wetting power they are useful in the textile, leather, paper manufacturing, and other industries.

By careful control of the process, the reaction may be kept to a state such that the end product is structurally:

Through small amounts of moisture admitted, the chlorine will split off in accordance with the following reaction:

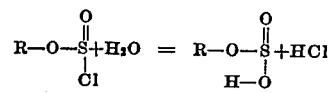

The

group can be further oxidized to form the true sulphuric ester or by boiling in neutral or slightly alkaline solution, an intra molecular rearrangement takes place to form the true sulphonic group:

One of the greatest advantages of any of the above reactions is the completeness of it. There is some contamination between the end products, that is, there are some sulphates with the sulphonic salts; some sulphonic salts with the sulphates; and there are both of these to some extent with the hydroxyl groups; and also some hydroxyl groups with both the sulphonic and sulphate groups. Also various amounts of the halogen substitutions may be left. This slight contamination of the various products is of no material consequence, however, as far as the technical uses are concerned. If desired, they can be separated.

From the above, it is apparent that with the aliphatic hydrocarbons, it is possible by my method to form directly halogen substitutions, sulphite esters, and a mixture of halogen substitutions and sulphite esters.

From the halogen substitutions, sulphite esters, and the mixture of halogen substitutions and sulphite esters, the following compounds may be readily formed:—sulphuric esters, hydroxy compounds or polyhydric alcohols, aliphatic sulphonic acids, or a combination of any two or three thereof in a single hydrocarbon compound.

There is apparently no limit in the size of the molecule which will react in accordance with my method provided they are kept in a fluid condition at the temperature of the reaction. With the higher melting substances, an inert solvent is used to obtain this condition.

A halogenated product containing a sulphonic acid group or a sulphuric ether group, or hydroxyl groups as pointed out above is water soluble and is useful as a solvent and/or detergent. It also has antiseptic properties and may also be used as an insecticide. Being water soluble it may be applied in almost any desired strength.

In halogenating fatty acids by my method, it is not necessary to separate them from the glycerine as the whole may be subjected to the two gases, the various subsequent steps of processing carried out, and the glycerine removed, if at all, whenever it is most convenient.

I find that my method of halogenating is also applicable to animal or vegetable fats and to mineral hydrocarbons or those of the aromatic series.

As an example of halogenating an aromatic hydrocarbon, chlorine and sulfur dioxide were passed into benzene ($C_6H_6$) at room temperature. The ratio of the gases being two for the chlorine and one for the sulphur dioxide by volume. Approximately ½ hour after starting the gas flow, the product of reaction reached the saturation point in the mother liquid and began to crystallize out in the bottom of the containing vessel. When the temperature is maintained below 50° C., the end product is para-chlor-benzol-chlor-sulphite; between 50 and 70° C. a mixture of this product and para-dichlor-benzol and above 70° C. para-dichlor-benzol. The product is separated from the mother liquid by decantation, filtration or wringing. When it is desired to make only the sulphite substitution product, the mother liquor is used again with additions of fresh benzol, or if the dichlor product is desired it is produced either in a similar manner or the unconverted benzol removed by distillation. The efficiency of the reaction is approximately 95% of the theoretical, according to the following equations:

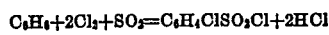

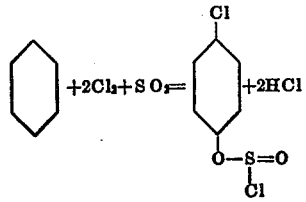

80 parts benzol; 150 parts chlorine; 70 parts sulphur dioxide.

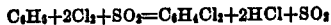

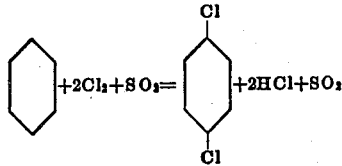

In addition to the specific examples of chlorinating paraffin and benzene cited above, I have also successfully chlorinated lard, olive oil, kerosene, lubricating oil, and others.

I find that the reaction during the time the compound is being halogenated, is accelerated by heat, light and pressure and by controlling any or all of these elements, the reaction may be also controlled accordingly.

The term halogen as used in the specification and claims is used to denote any of the four elements, fluorine, chlorine, bromine or iodine. While I find that sulphur dioxide with any of the halogens and particularly with chlorine serve to carry out my method, these are selected for their abundance in nature and their relative small expense and ease of handling as compared with selenium or tellurium oxides which have chemical properties similar to sulphur dioxide and which I believe may be substituted therefor.

What I claim is:

1. The method of halogenating a hydrocarbon which consists in first rendering said hydrocarbon fluid, then simultaneously passing through said hydrocarbon a mixture of gases consisting of one of the halogens and a dioxide of an element of the group consisting of sulphur, selenium, and tellurium.

2. The method of halogenating a hydrocarbon which consists in first rendering said hydrocarbon fluid, then simultaneously passing through said fluid hydrocarbon a mixture of gases consisting of one of the halogens and a dioxide of an element of the group consisting of sulphur, selenium, and tellurium, and controlling said reaction to prevent polymerization of the hydrocarbon.

3. The method of forming a substitution product from a hydrocarbon which consists in replacing at least one of the hydrogen atoms with a substituent having the structure of

wherein X is one of the halogens.

4. The method of forming a substitution product from a hydrocarbon which consists in replacing at least one of the hydrogen atoms with a substituent having the structure of

wherein X is one of the halogens, and then replacing said substituent with one of the halogens.

5. The method of forming a substitution product from a hydrocarbon which consists in controlling the temperature of the reaction while replacing at least one of the hydrogen atoms with a substituent having a structure of

formed by the chemical union of a gaseous halogen and a gaseous dioxide of an element of the group consisting of sulphur, selenium and tellurium, and wherein X is one of the halogens and Y is sulphur, selenium or tellurium.

6. The method of forming a substitution product from a hydrocarbon which consists in reacting said hydrocarbon with a gaseous mixture of a halogen and a dioxide of an element of the group consisting of sulphur, selenium, and tellurium to effect a replacement of at least one hydrogen atom with a substituent having a carbon oxygen linkage in the product.

7. The method of forming a substitution product from a hydrocarbon which consists in reacting said hydrocarbon with a gaseous mixture of a halogen and a dioxide of an element of the group consisting of sulphur, selenium and tellurium to effect a replacement of at least one hydrogen atom with a substituent having a carbon oxygen linkage in the product and simultaneously controlling said reaction to prevent polymerization of the hydrocarbon and product.

8. The method of forming a substitution product from a hydrocarbon which consists in reacting said hydrocarbon with a gaseous mixture of a halogen and a dioxide of an element of the group consisting of sulphur, selenium and tellurium to effect a replacement of at least one hydrogen atom with a substituent formed by the chemical union of said gases.

9. The method of forming a substitution product from a hydrocarbon which consists in reacting said hydrocarbon with a gaseous mixture of a halogen and a dioxide of an element of the group consisting of sulphur, selenium and tellurium at a temperature below that which would normally disturb the chemical structure of the hydrocarbon, thereby to effect a replacement of at least one hydrogen atom with a substituent formed by the chemical union of said gases, and subsequently reducing the temperature to control the reaction.

10. The method of forming a substitution product from a hydrocarbon which consists in reacting said hydrocarbon with a gaseous mixture of a halogen and a dioxide of an element, of the group consisting of sulphur, selenium and tellurium at a temperature below the boiling point of the hydrocarbon, thereby to effect halogenation of the hydrocarbon.

11. The method of forming a substitution product from a hydrocarbon which consists in reacting said hydrocarbon with a gaseous mixture of a halogen and a dioxide of an element of the group consisting of sulphur, selenium and tellurium thereby to effect halogenation of the hydrocarbon, and stopping said reaction before complete halogenation of the hydrocarbon to provide a replacement of at least one hydrogen atom with a substituent formed by the chemical union of said gases.

12. The method of forming a substitution product from a hydrocarbon which consists in reacting said hydrocarbon with a gaseous mixture of a halogen and a dioxide of an element of the group consisting of sulphur, selenium and tellurium at a temperature below the normal boiling point of the hydrocarbon, thereby to effect halogenation of the hydrocarbon, and controlling the speed of the reaction as the halogenation proceeds to prevent polymerization of the compound.

13. The method of forming a substitution product from a hydrocarbon which consists in reacting said hydrocarbon with a gaseous mixture of a halogen and a dioxide of an element of the group consisting of sulphur, selenium and tellurium at a temperature below the normal boiling point of the hydrocarbon, thereby to effect halogenation of the hydrocarbon, and controlling the speed of the reaction as the halogenation proceeds to prevent polymerization of the compound, and stopping the reaction before complete halogenation of the hydrocarbon, to provide a replacement of at least one hydrogen atom with a substituent formed by the chemical union of said gases.

14. The method of forming a substitution product from a hydrocarbon which consists in reacting said hydrocarbon with a gaseous mixture of a halogen and sulphur dioxide to effect a replacement of at least one hydrogen atom with a substituent formed by the chemical union of said gases.

15. The method of forming a substitution product from a hydrocarbon which consists in controlling the temperature of the reaction while replacing at least one of the hydrogen atoms with a substituent formed by the chemical union of a halogen and a dioxide of an element of the group consisting of sulphur, selenium and tellurium, and wherein the substituent is substituted for the hydrogen by a carbon-oxygen linkage in the product.

16. The method of forming a substitution product from a hydrocarbon which consists in controlling the temperature of the reaction while replacing at least one of the hydrogen atoms with a substituent formed by the chemical union of a halogen and sulphur dioxide to form a sulphite group and wherein the sulphite group is substituted for a hydrogen atom by a carbon-oxygen linkage in the product.

17. The method of forming a substitution product from a hydrocarbon which consists in controlling the reaction to prevent polymerization while replacing at least one of the hydrogen atoms with a substituent having a structure of

formed by the chemical union of chlorine and a dioxide of one of the elements of the group consisting of sulphur, selenium and tellurium, and wherein Y represents one of the elements of said group.

18. The method of forming a substitution product from a hydrocarbon which consists in controlling the reaction to prevent polymerization while replacing at least one of the hydrogen atoms with a substituent formed by the chemical union of chlorine and sulphur dioxide, said substituent having a structure of

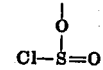

19. The method of forming a substitution product from a hydrocarbon which consists in reacting the fluid hydrocarbon with a gaseous mixture of chlorine and sulphur dioxide to effect a chlorine substitution in the hydrocarbon.

20. The method of forming a substitution product in a hydrocarbon of the aliphatic series which consists in reacting the hydrocarbon with chlorine and sulphur dioxide to form a chlorine substitution product and a replacement of at least one hydrogen atom with a substituent having a structure of $$\text{Cl}-\overset{\overset{\text{O}}{|}}{\text{S}}=\text{O}$$

and controlling the temperature of the reaction to prevent polymerization.

21. The method of forming a substitution product of the aromatic series which consists in reacting a hydrocarbon with chlorine and sulphur dioxide to effect a chlorine substitution, and controlling the reaction to prevent polymerization.

22. As a new product, a hydrocarbon having at least one of its hydrogen atoms replaced by a substituent consisting of a halogen and a dioxide of an element of the group consisting of sulphur, selenium and tellurium, said substituent having a carbon oxygen linkage in the product.

23. As a new product, a hydrocarbon having at least one of its hydrogen atoms replaced by a substituent consisting of chlorine and a dioxide of an element of the group consisting of sulphur, selenium and tellurium, said substituent having a carbon oxygen linkage in the product.

24. As a new product, a hydrocarbon having at least one of its hydrogen atoms replaced by a substituent consisting of a halogen and sulphur dioxide wherein the substituent has a carbon oxygen linkage in the product.

25. As a new product, a hydrocarbon having at least one of its hydrogen atoms replaced by a substituent consisting of a halogen and a dioxide of an element of the group consisting of sulphur, selenium and tellurium, said substituent having a structure of $$\text{X}-\overset{\overset{\text{O}}{|}}{\text{Y}}=\text{O}$$

wherein X is a halogen and Y an element of said group, and other of its hydrogen atoms replaced by a halogen.

26. As a new product, a hydrocarbon having at least one of its hydrogen atoms replaced by a substituent having a structure of $$\text{X}-\overset{\overset{\text{O}}{|}}{\text{Y}}=\text{O}$$

wherein X is a halogen and Y is an element of the group consisting of sulphur, selenium and tellurium.

27. As a new product, a hydrocarbon having at least one of its hydrogen atoms replaced by a substituent having a structure of $$\text{X}-\overset{\overset{\text{O}}{|}}{\text{Y}}=\text{O}$$

wherein X is a halogen and Y is an element of the group consisting of sulphur, selenium and tellurium, and other of its hydrogen atoms replaced by chlorine.

CORTES F. REED.